United States Patent
Vora et al.

(10) Patent No.: US 11,634,155 B2
(45) Date of Patent: Apr. 25, 2023

(54) SEQUENTIAL FUSION FOR 3D OBJECT DETECTION

(71) Applicant: Motional AD LLC, Boston, MA (US)

(72) Inventors: Sourabh Vora, Marina Del Rey, CA (US); Oscar Olof Beijbom, Santa Monica, CA (US); Alex Hunter Lang, Culver City, CA (US); Bassam Helou, Santa Monica, CA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/534,674

(22) Filed: Nov. 24, 2021

(65) Prior Publication Data

US 2022/0080999 A1    Mar. 17, 2022

Related U.S. Application Data

(63) Continuation of application No. 17/096,916, filed on Nov. 12, 2020, now Pat. No. 11,214,281.
(Continued)

(51) Int. Cl.
*G06N 3/08* (2006.01)
*B60W 60/00* (2020.01)
*G06T 7/10* (2017.01)

(52) U.S. Cl.
CPC ............ *B60W 60/001* (2020.02); *G06N 3/08* (2013.01); *G06T 7/10* (2017.01);
(Continued)

(58) Field of Classification Search
None
See application file for complete search history.

(56) References Cited

U.S. PATENT DOCUMENTS

| 8,825,391 | B1 | 9/2014 | Urmson et al. |
| 8,885,151 | B1 | 11/2014 | Chatham et al. |

(Continued)

FOREIGN PATENT DOCUMENTS

| CN | 108171217 | 6/2018 |
| CN | 108475058 A | 8/2018 |

(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Sep. 30, 2016, 30 pages.
(Continued)

*Primary Examiner* — Idowu O Osifade
(74) *Attorney, Agent, or Firm* — Fish & Richardson P.C.

(57) ABSTRACT

Techniques are provided for improving a perception processing pipeline for object detection that fuses image segmentation data (e.g., segmentation scores) with LiDAR points. The disclosed techniques are implemented using an architecture that accepts point clouds and images as input and estimates oriented 3D bounding boxes for all relevant object classes. In an embodiment, a method comprises: matching temporally, using one or more processors of a vehicle, points in a three-dimensional (3D) point cloud with an image; generating, using an image-based neural network, semantic data for the image; decorating, using the one or more processors, the points in the 3D point cloud with the semantic data; and estimating, using a 3D object detector with the decorated points as input, oriented 3D bounding boxes for the one or more objects.

24 Claims, 16 Drawing Sheets

Related U.S. Application Data

(60) Provisional application No. 62/935,917, filed on Nov. 14, 2019.

(52) U.S. Cl.
CPC ... *B60W 2420/403* (2013.01); *B60W 2420/52* (2013.01); *G06T 2207/10028* (2013.01); *G06T 2210/12* (2013.01)

(56) References Cited

U.S. PATENT DOCUMENTS

| | | | |
|---|---|---|---|
| 10,970,518 | B1 | 4/2021 | Zhou et al. |
| 11,100,669 | B1 | 8/2021 | Zhou et al. |
| 11,214,281 | B2 | 1/2022 | Vora et al. |
| 2002/0107637 | A1 | 8/2002 | Okamura et al. |
| 2017/0247036 | A1 | 8/2017 | Halder et al. |
| 2018/0203124 | A1 | 7/2018 | Izzat et al. |
| 2019/0096086 | A1 | 3/2019 | Xu et al. |
| 2019/0279368 | A1 | 9/2019 | Feng et al. |
| 2019/0291723 | A1 | 9/2019 | Srivatsa et al. |
| 2019/0332118 | A1 | 10/2019 | Wang et al. |
| 2020/0150235 | A1 | 5/2020 | Beijbom et al. |
| 2020/0293751 | A1* | 9/2020 | Zeng ............... G06K 9/00664 |
| 2020/0309957 | A1* | 10/2020 | Bhaskaran ............ G01S 7/484 |
| 2021/0073345 | A1 | 3/2021 | St. Romain et al. |
| 2021/0096241 | A1* | 4/2021 | Bongio Karrman ................ G05D 1/0088 |
| 2021/0146952 | A1 | 5/2021 | Vora et al. |

FOREIGN PATENT DOCUMENTS

| | | |
|---|---|---|
| CN | 109597087 A | 4/2019 |
| CN | 111145174 | 5/2020 |
| EP | 3349041 | 7/2018 |
| WO | WO 2018170472 | 9/2018 |

OTHER PUBLICATIONS

Chen et al., "Multi-View 3D Object Detection Network for Autonomous Driving," IEEE Conference on Computer Vision and Pattern Recognition, Jun. 22, 2017, 9 pages.

Everingham et al., "The pascal visual object classes (VOC) challenge," International Journal of Computer Vision, Sep. 9, 2009, 34 pages.

Geiger et al., "Are we ready for Autonomous Driving? The KITTI Vision Benchmark Suite," IEEE Conference on Computer Vision and Pattern Recognition, Jun. 16, 2012, pp. 1-8.

Ikhwantri et al., "Learning semantic segmentation score in weakly supervised convolutional neural network," International Conference on Computers, Communications, and Systems (ICCCS), Nov. 2, 2015, 19-25.

Ioffe et al., "Batch normalization: Accelerating deep network training by reducing internal covariate shift," CORR, Feb. 11, 2015, 11 pages.

Ku et al., "Joint 3D Proposal Generation and Object Detection from View Aggregation," Computer Vision and Pattern Recognition, Jul. 12, 2018, 8 pages.

Lang et al., "PointPillars: Fast Encoders for Object Detection From Point Clouds," 2019 IEEE/CVF Conference on Computer Vision and Pattern Recognition (CVPR), IEEE, Jun. 15, 2019, 12689-12697.

Liu et al., "SSD: Single Shot MutliBox Detector," European Conference on computer vision, Oct. 8, 2016, pp. 1-17.

Meyer et al., "Lasernet: An efficient probabilistic 3d object detector for autonomous driving," In Proceedings of the IEEE Conference on Computer Vision and Pattern Recognition, Mar. 20, 2019 pp. 12677-12687.

Nair et al., "Rectified linear units improve restricted Boltzmann machines," InICML, Jan. 1, 2010, 8 pages.

Qi et al, "PointNett++: Deep Hierarchical Feature Learning on Point Sets in a Metric Space," IEEE Conference on Computer Vision and Pattern Recognition, Jun. 7, 2017, 14 pages.

Qi et al., "Frustum PointNets for 3D Object Detection from RGB-D Data," IEEE Conference on Computer Vision and Pattern Recognition, Apr. 13, 2018, 15 pages.

Qi et al., "Pointnet: Deep learning on point sets for 3d classification and segmentation," IEEE Proc. Computer Vision and Pattern Recognition, Apr. 10, 2017, pp. 1-19.

Sahba et al., "3D Object Detection Based on LiDAR Data," 2019 IEEE 10th Annual Ubiquitous Computing, Electronics & Mobile Communication Conference (UEMCON), New York City, NY, USA, Oct. 10-12, 2019, pp. 0511-0514.

Simonyan et al., "Very Deep Convolutional Networks for Large-Scale Image Recognition," ICLR, Apr. 10, 2015, 14 pages.

Wang et al., "Pseudo-lidar from visual depth estimation: Bridging the gap in 3d object detection for autonomous driving," In The IEEE Conference on Computer Vision and Pattern Recognition, Jun. 2019, 16 pages.

Yan et al., "SECOND: Sparsely embedded convolutional detection." Sensors, Aug. 20, 2018, 18; 1-17.

Yang et al., "PIXOR: Real-time 3D Object Detection from Point Clouds," IEEE conference on Computer Vision and Pattern Recognition, Feb. 17, 2019, 7652-7660.

Yang et al., "Std: Sparse—to dense 3d object detector for point cloud," In Proceedings of the IEEE International Conference on Computer Vision, Jul. 22, 2019, pp. 1951-1960.

Zhang et al., "Efficient Convolutions for Real-Time Semantic Segmentation of 3D Point Clouds," IEEE: 2018 International Conference on 3D Vision (3DV), May 5, 2018, pp. 399-408.

Zhou et al., "VoxelNet: End-to-End Learning for Point Cloud Based 3D Object Detection," IEEE Conference on Computer Vision and Pattern Recognition, Nov. 17, 2017, 10 pages.

\* cited by examiner

SEQUENTIAL FUSION FOR 3D OBJECT DETECTION

RELATED APPLICATION

This application is a continuation of U.S. application Ser. No. 17/096,916, filed Nov. 12, 2020 (now allowed), which claims priority to U.S. Provisional Patent Application Ser. No. 62/935,617, entitled "SEQUENTIAL FUSION FOR 3D OBJECT DETECTION" and filed on Nov. 14, 2019, the entire contents of which are incorporated herein by reference.

TECHNICAL FIELD

This description relates generally to the operation of vehicles and specifically to perception pipelines for self-driving vehicles.

BACKGROUND

Self-driving vehicles typically use light detection and ranging (LiDAR) sensors to generate two-dimensional (2D) or three-dimensional (3D) point clouds that are processed in a perception pipeline using deep learning techniques optimized for 3D point clouds to detect and classify objects in the operating environment of the vehicle. Self-driving vehicles also use several camera sensors to generate 2D images that are processed using deep learning techniques optimized for images to detect and classify objects in the operating environment of the vehicle. Each of these perception pipelines have advantages and disadvantages. Cameras allow accurate measurements of edges, color and lighting, thus enabling classification and localization on the image plane, but provide inaccurate 3D localization. LiDAR point clouds contain less semantic information but provide highly accurate 3D localization. LiDAR data, however, is sparse and the range is typically limited to 50-100 m.

DETAILED DESCRIPTION

Figure 1:
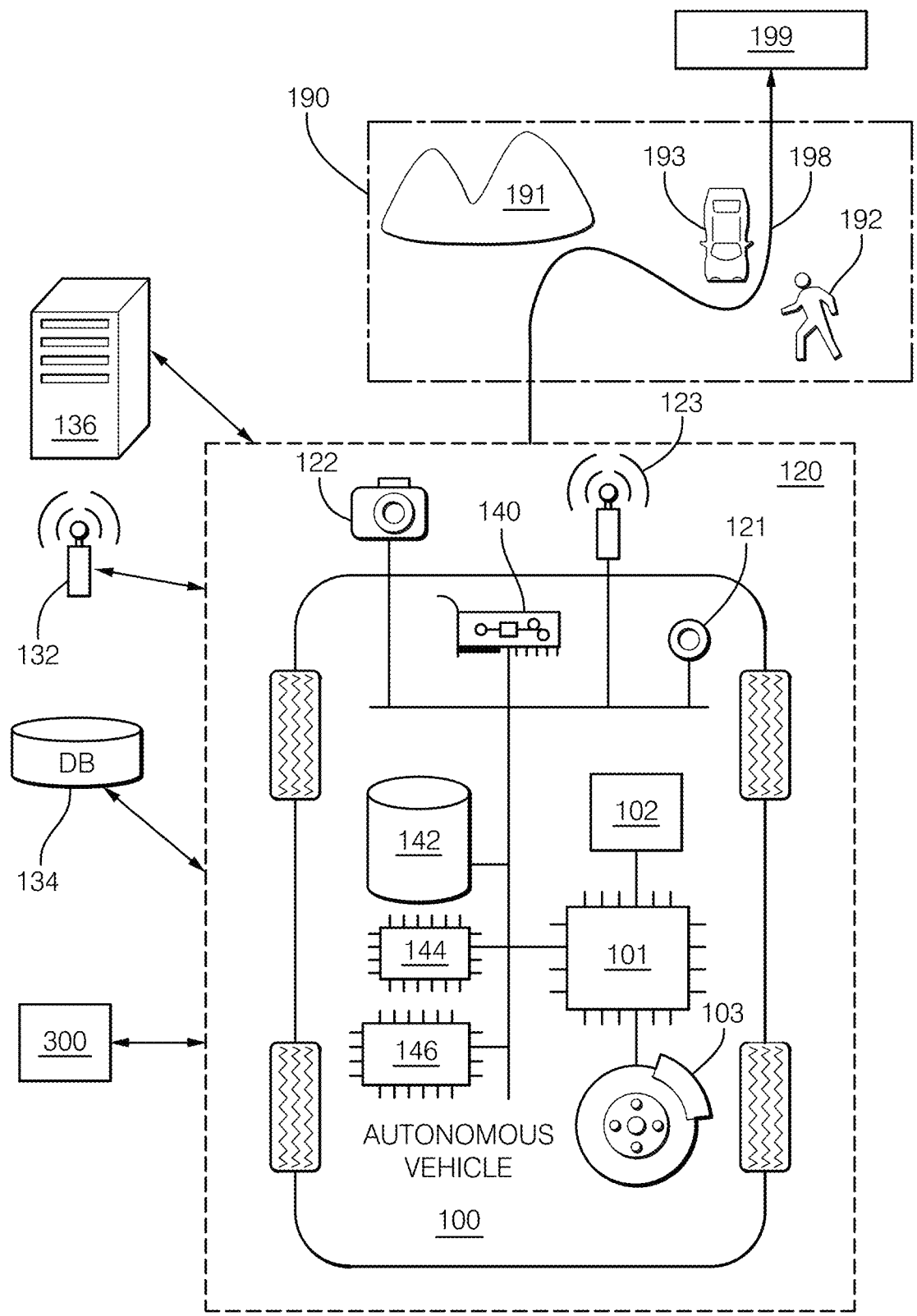
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Sequential Fusion for 3D Object Detection General Overview Techniques are provided for improving a perception processing pipeline for object detection that fuses image semantic data (e.g., semantic segmentation scores) with LiDAR points. The disclosed techniques are implemented using a sequential fusion architecture for 3D object detection that accepts LiDAR point clouds and camera images as input and estimates oriented 3D bounding boxes for all relevant object classes. In an embodiment, the architecture includes three main stages: 1) a semantic segmentation stage that computes semantic data (e.g., semantic segmentation scores); 2) a fusion stage that decorates LiDAR points with the semantic data; and 3) a 3D object detection stage where a LiDAR-based network takes the fused point cloud as input and estimates oriented 3D bounding boxes for all classes.

In an embodiment, each LiDAR point is projected into an output of an image semantic network (ISN) and the channel-wise activations are concatenated with the position coordinates x, y, z and intensity value i of the LiDAR point. In an embodiment, these decorated LiDAR points are then used in any LiDAR detection method, including but not limited to any birds eye view (BEV) or forward-view detection method, such as for example: PointPillars, LaserNet, VoxelNet, SECOND and STD.

PointPillars, as consistent with at least some implementations, is described in PointPillars: Fast Encoders for Object Detection from Point Clouds, arXiv:1812.05784v2 [cs.LG] 7 May 2019.

LaserNet, as consistent with at least some implementations, is described in G. P. Meyer, A. Laddha, E. Kee, C. Vallespi-Gonzalez, and C. K. Wellington. Lasernet: An efficient probabilistic 3d object detector for autonomous driving. In *Proceedings of the IEEE Conference on Computer Vision and Pattern Recognition*, pages 12677-12686, 2019.

VoxelNet, as consistent with at least some implementations, is described in Y. Zhou and O. Tuzel. Voxelnet: End-to-end learning for 918 point cloud based 3d object detection. In *CVPR*, 2018.

SECOND, as consistent with at least some implementations, is described in Y. Yan, Y. Mao, and B. Li. SECOND: Sparsely embedded convolutional detection. *Sensors*, 18(10), 2018.

STD, as consistent with at least some implementations, is described in Z. Yang, Y. Sun, S. Liu, X. Shen, and J. Jia. Std: Sparse-to-dense 3d object detector for point cloud. In *Proceedings of the IEEE International Conference on Computer Vision*, pages 1951-1960, 2019.

In an embodiment, the proposed method is sequential rather than end-to-end, meaning that the ISN is not trained for the final task of 3D detection. This suggests suboptimality in terms of performance. However, a sequential approach has several advantages: 1) semantic segmentation of an image has many uses and is therefore a useful stand-alone intermediate product, and 2) in a real-time system latency can be reduced by pipelining the image and LiDAR networks such that the LiDAR points are decorated with the semantics from the previous image.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
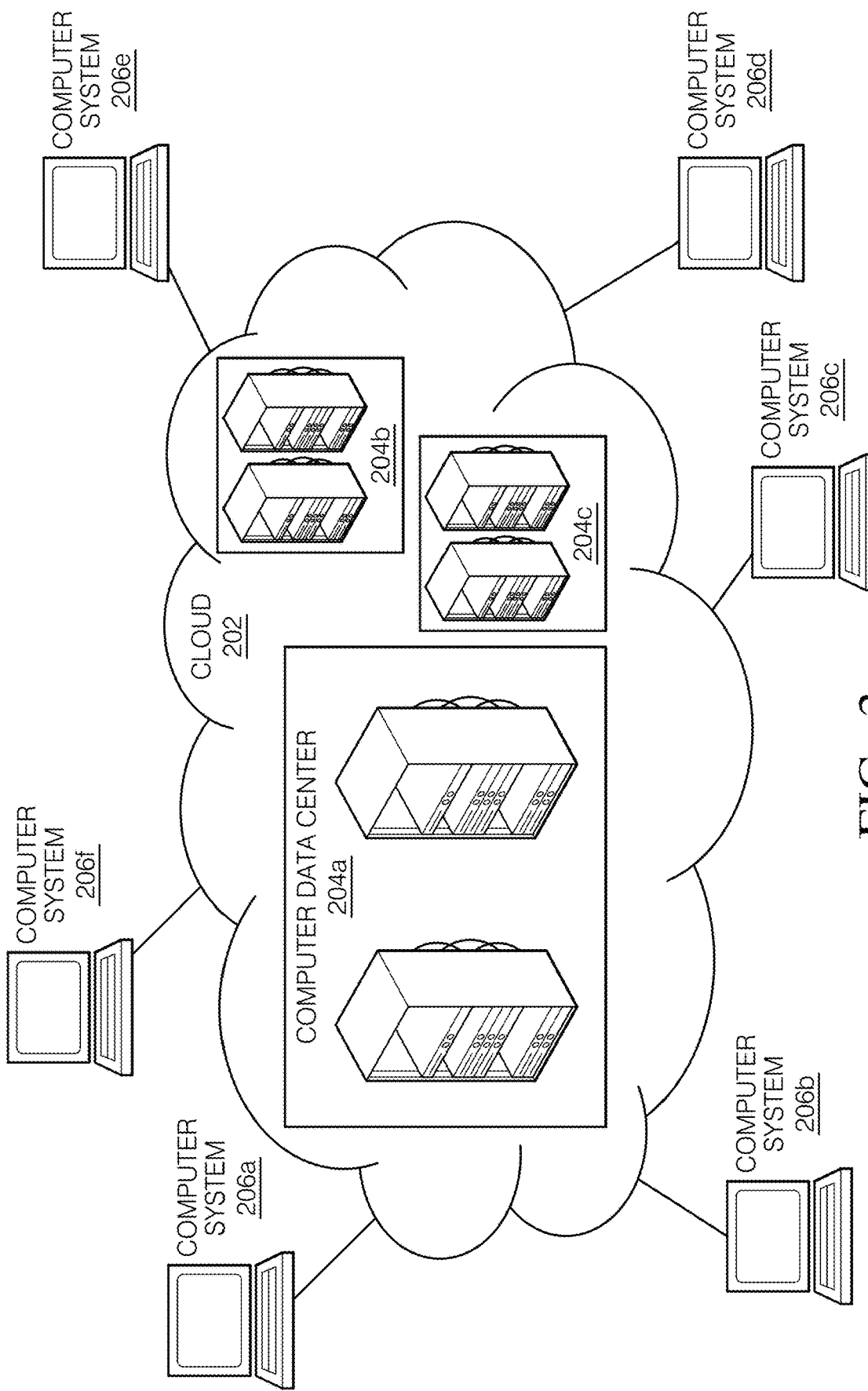
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
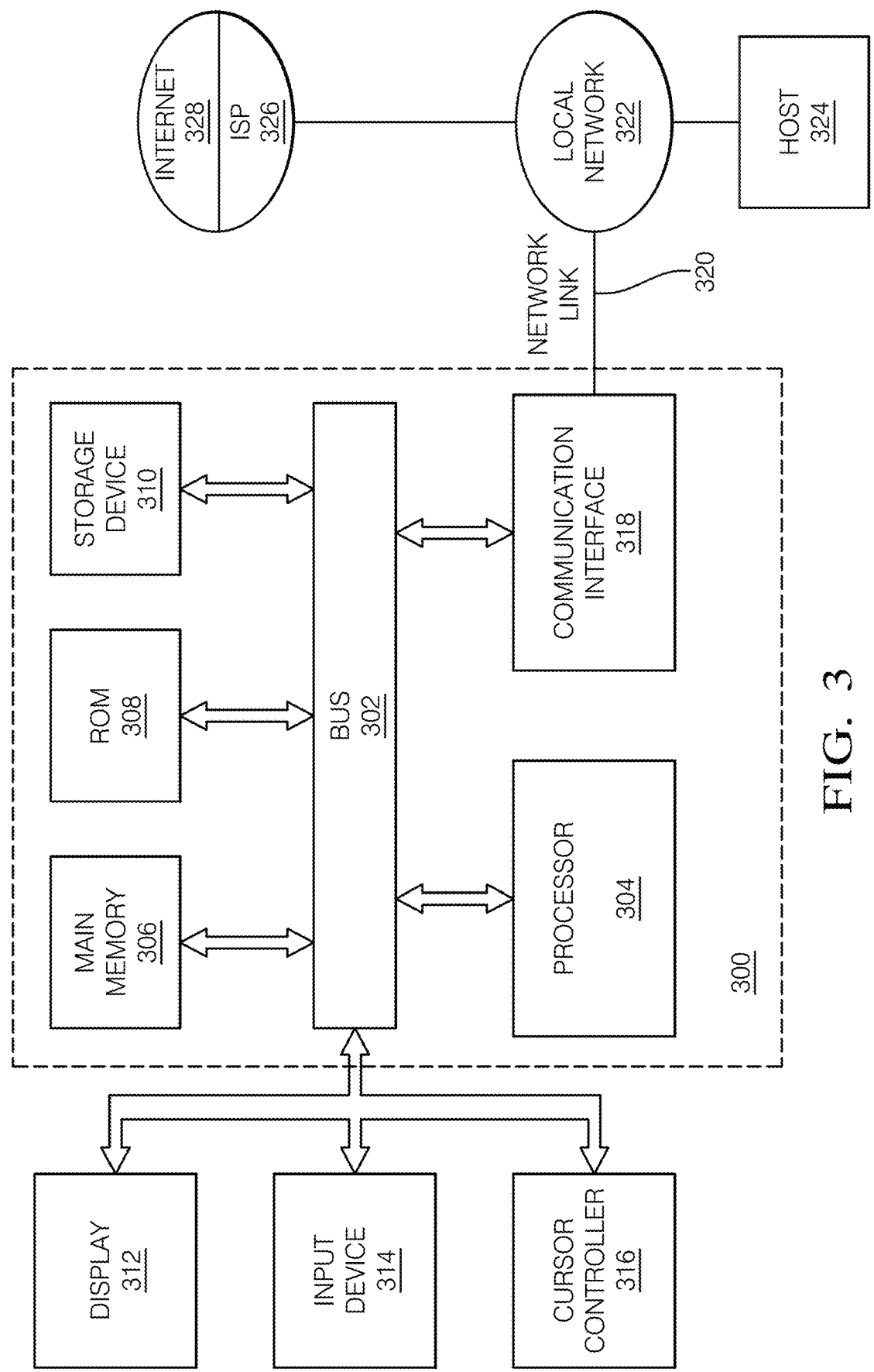
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
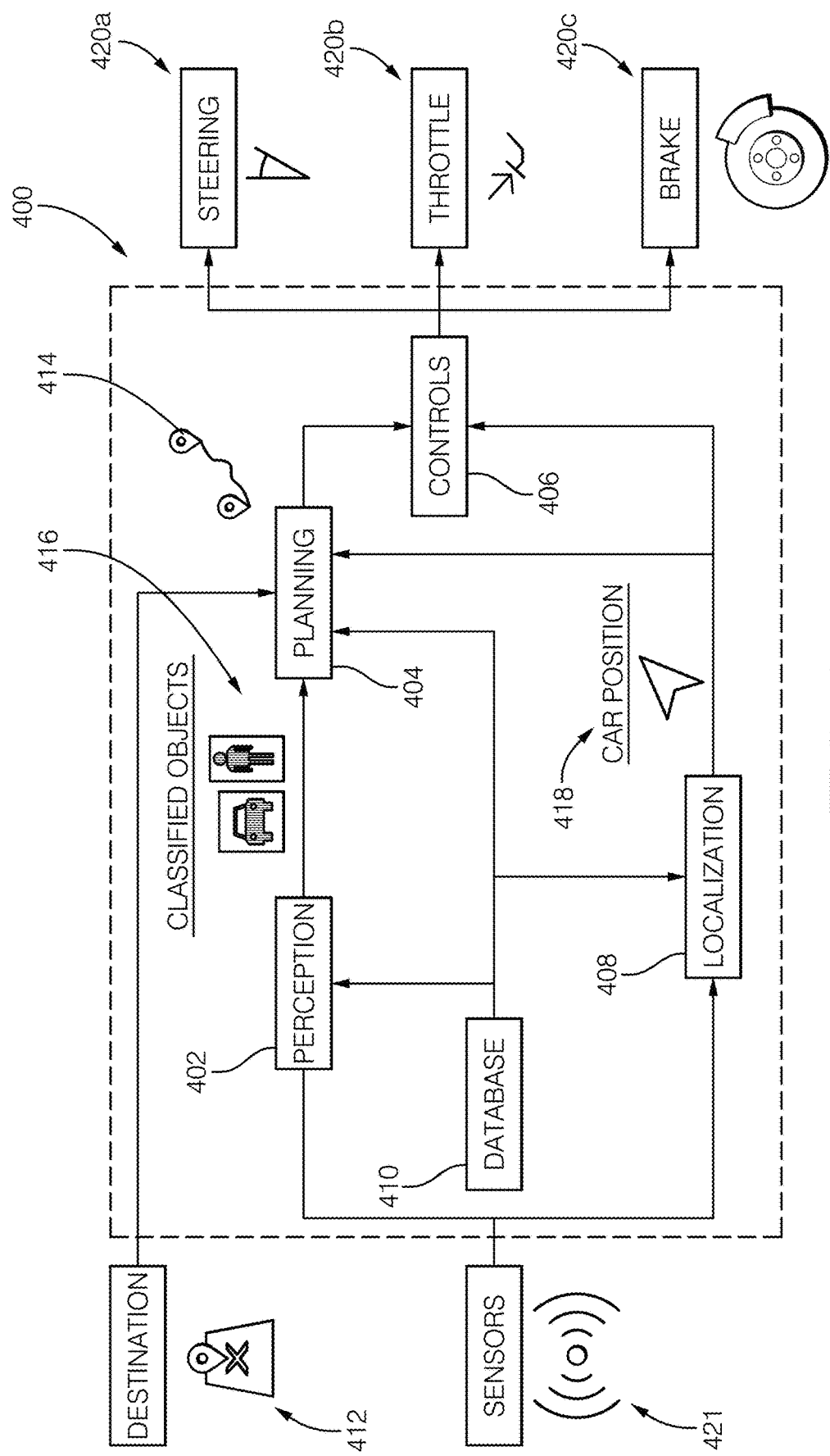
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420*a-c* (e.g., steering, throttling, braking, ignition) of the AV in a manner that will cause the AV 100 to travel the trajectory 414 to the destination 412. For example, if the trajectory 414 includes a left turn, the control module 406 will operate the control functions 420*a-c* in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
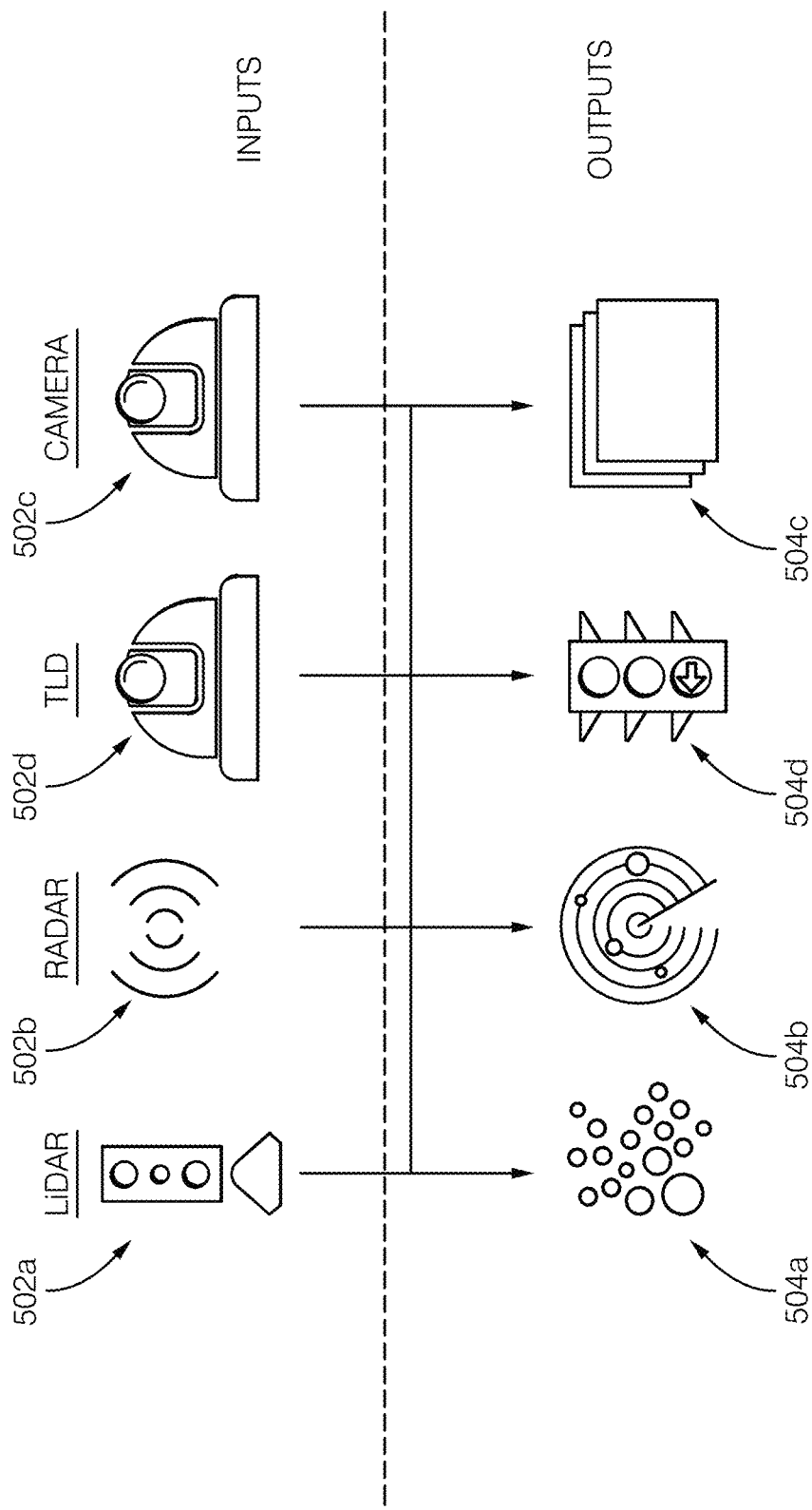
FIG. 5 shows an example of inputs and outputs that may be used by a perception module, in accordance with one or more embodiments.

FIG. 5 shows an example of inputs 502*a-d* (e.g., sensors 121 shown in FIG. 1) and outputs 504*a-d* (e.g., sensor data) that is used by the perception module 402 (FIG. 4). One input 502*a* is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as a point clouds) that are used to construct a representation of the environment 190.

Another input 502*b* is a RADAR system. RADAR is a technology that uses radio waves to obtain data about nearby physical objects. RADARs can obtain data about objects not within the line of sight of a LiDAR system. A RADAR system 502*b* produces RADAR data as output 504*b*. For example, RADAR data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual operation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
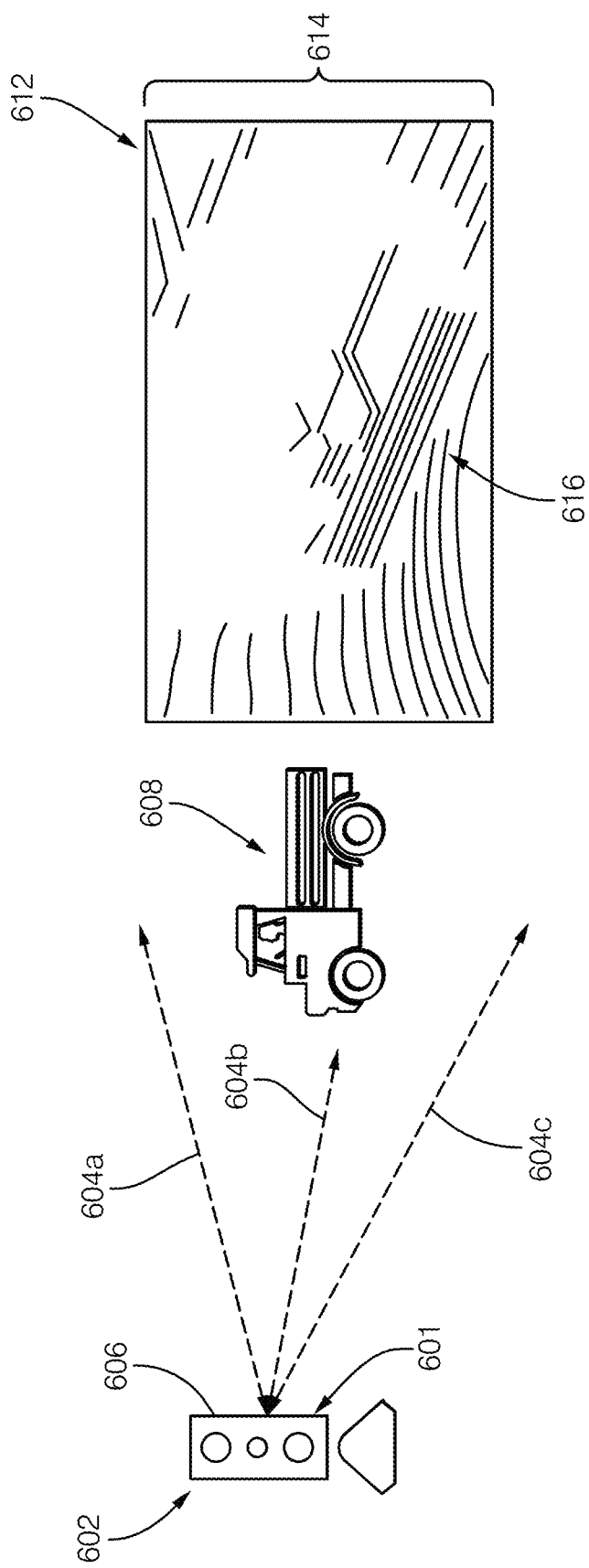
FIG. 6 shows an example of a LiDAR system, in accordance with one or more embodiments.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
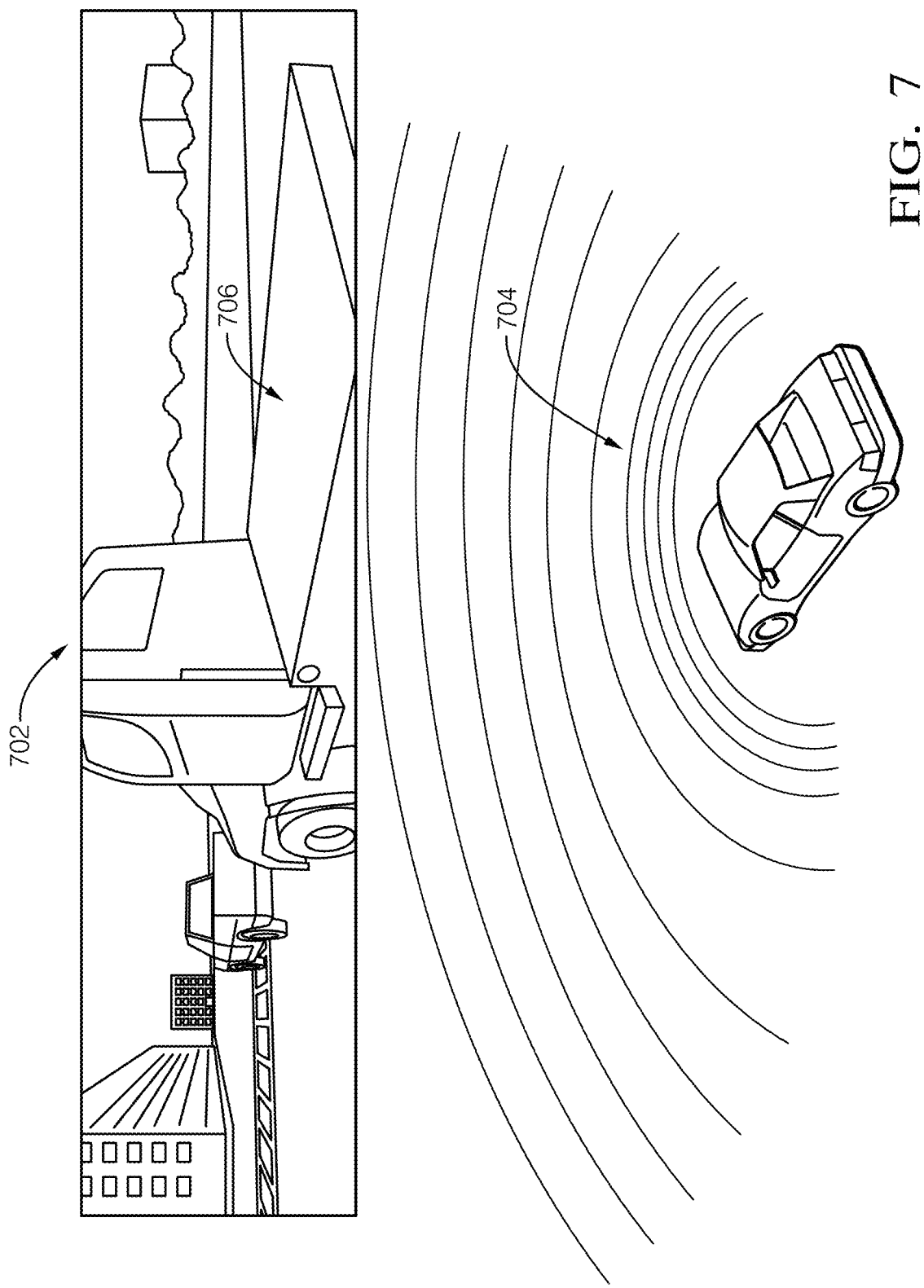
FIG. 7 shows the LiDAR system in operation, in accordance with one or more embodiments.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
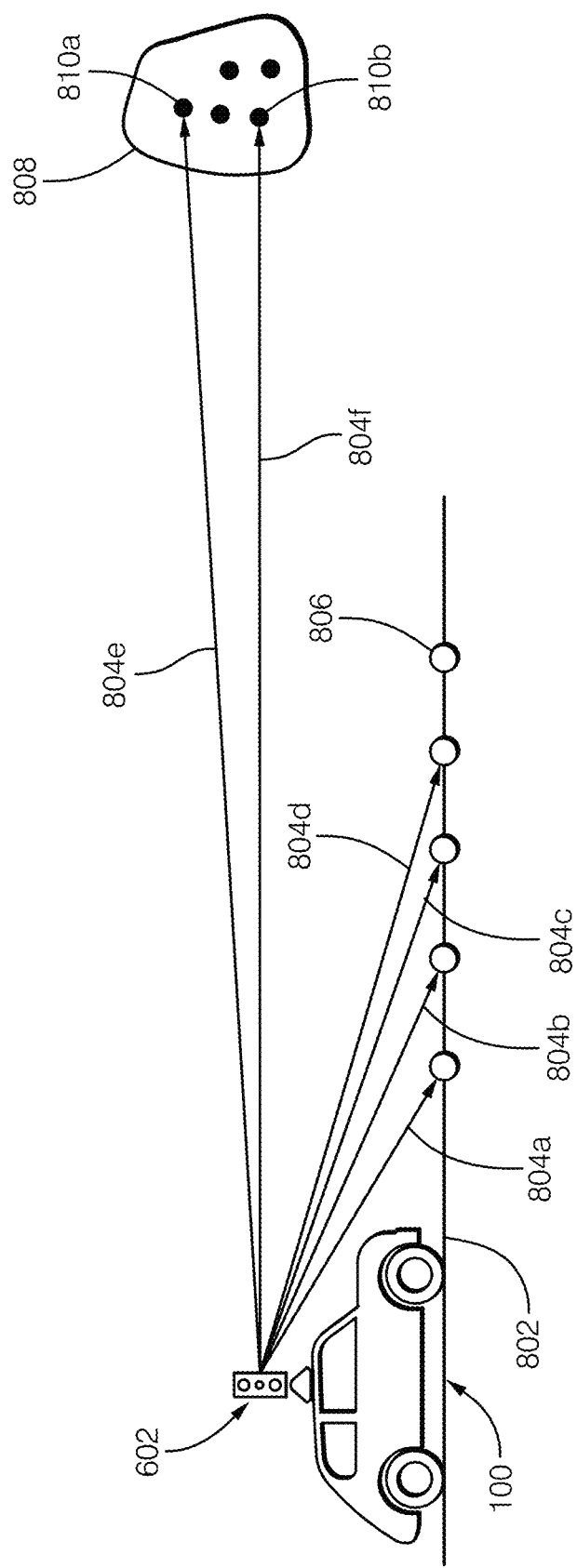
FIG. 8 shows the operation of the LiDAR system in additional detail, in accordance with one or more embodiments.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
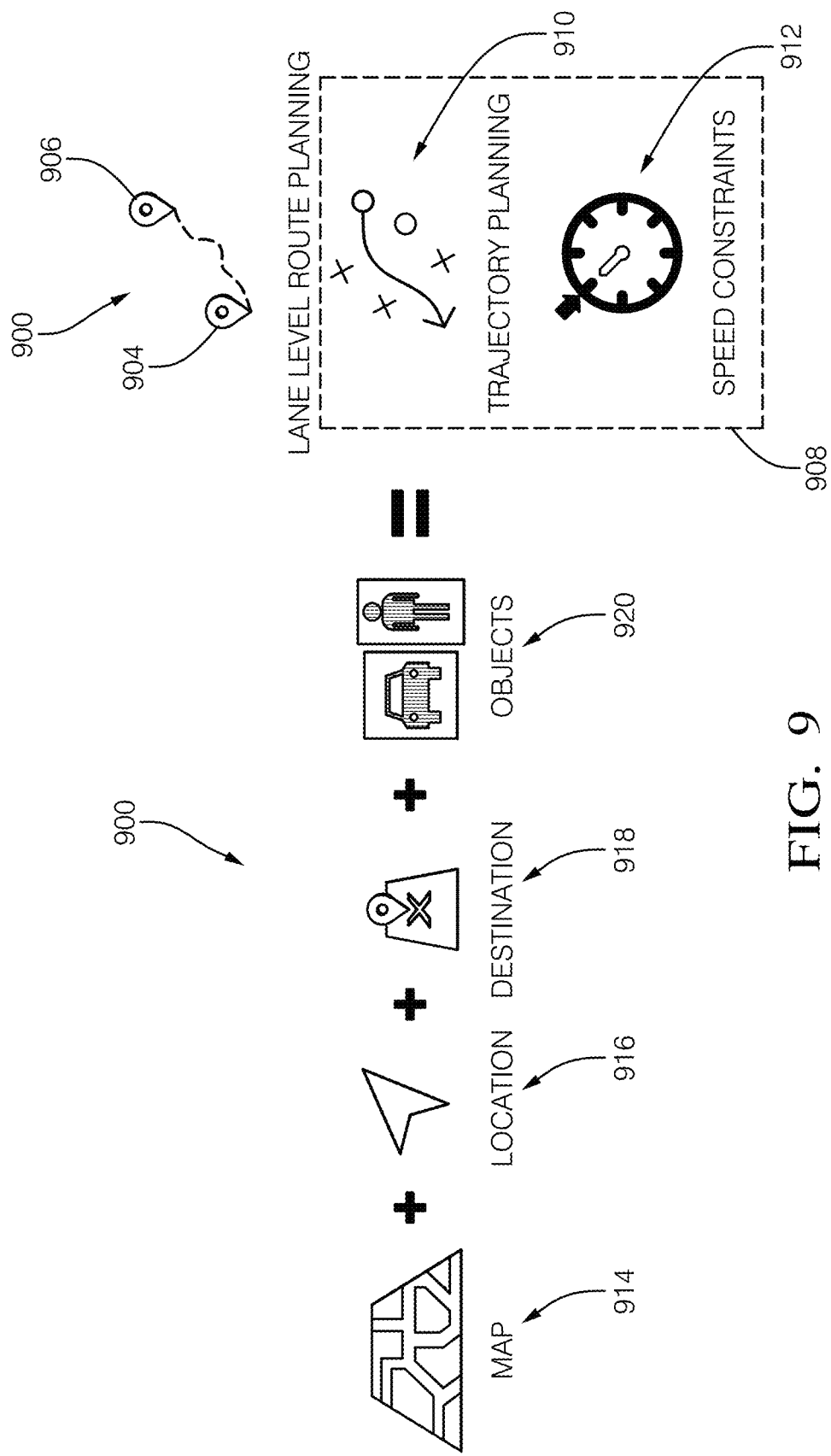
FIG. 9 shows a block diagram of the relationships between inputs and outputs of a planning module, in accordance with one or more embodiments.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
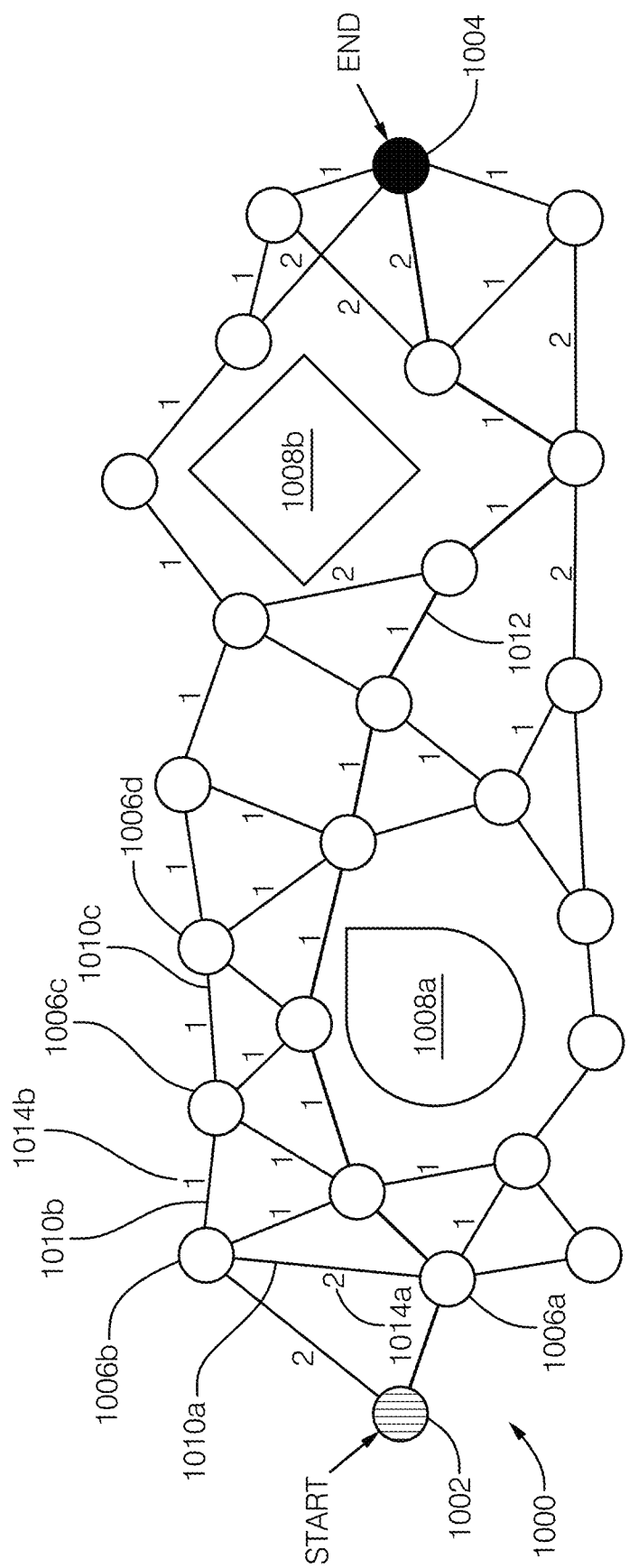
FIG. 10 shows a directed graph used in path planning, in accordance with one or more embodiments.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
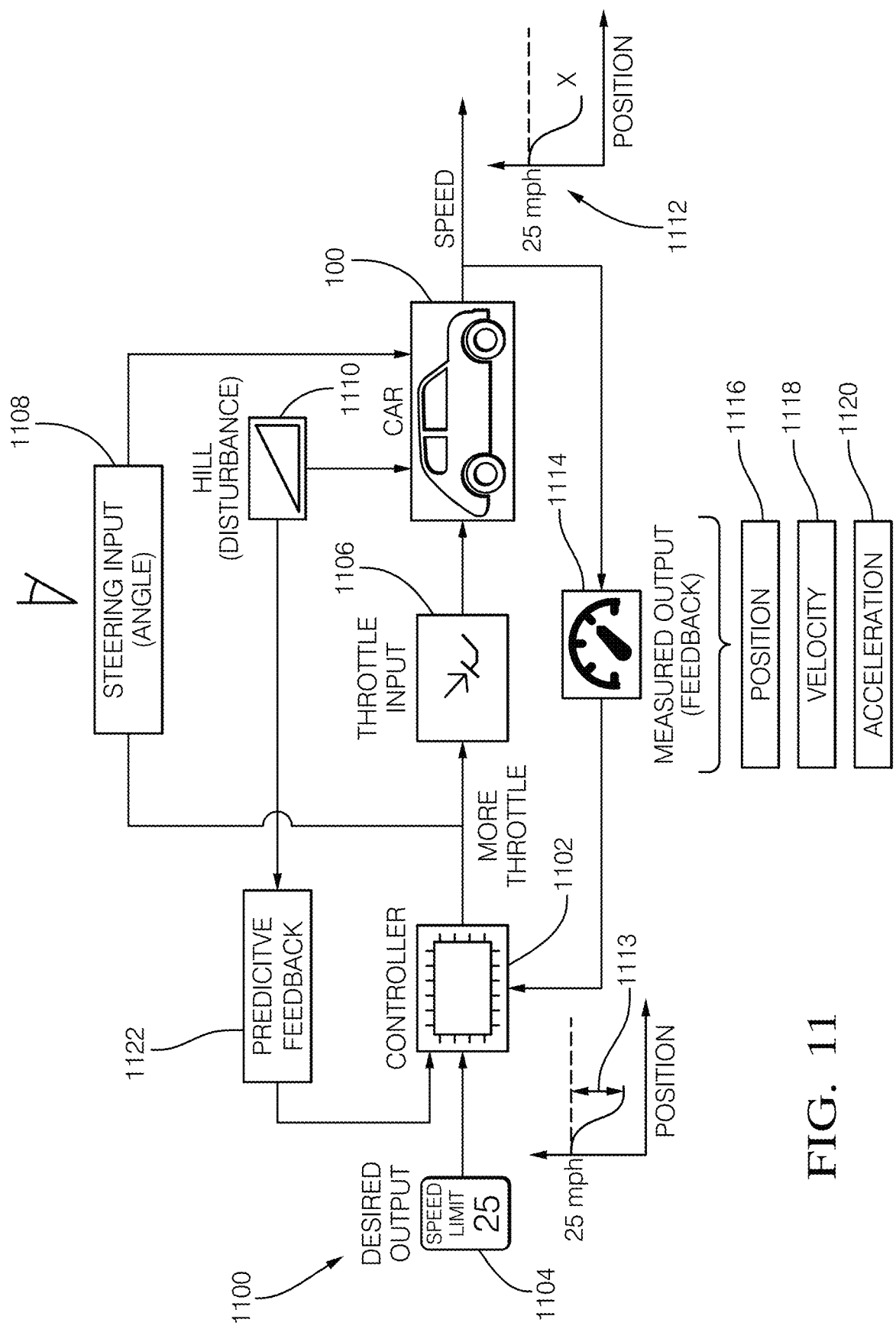
FIG. 11 shows a block diagram of the inputs and outputs of a control module, in accordance with one or more embodiments.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
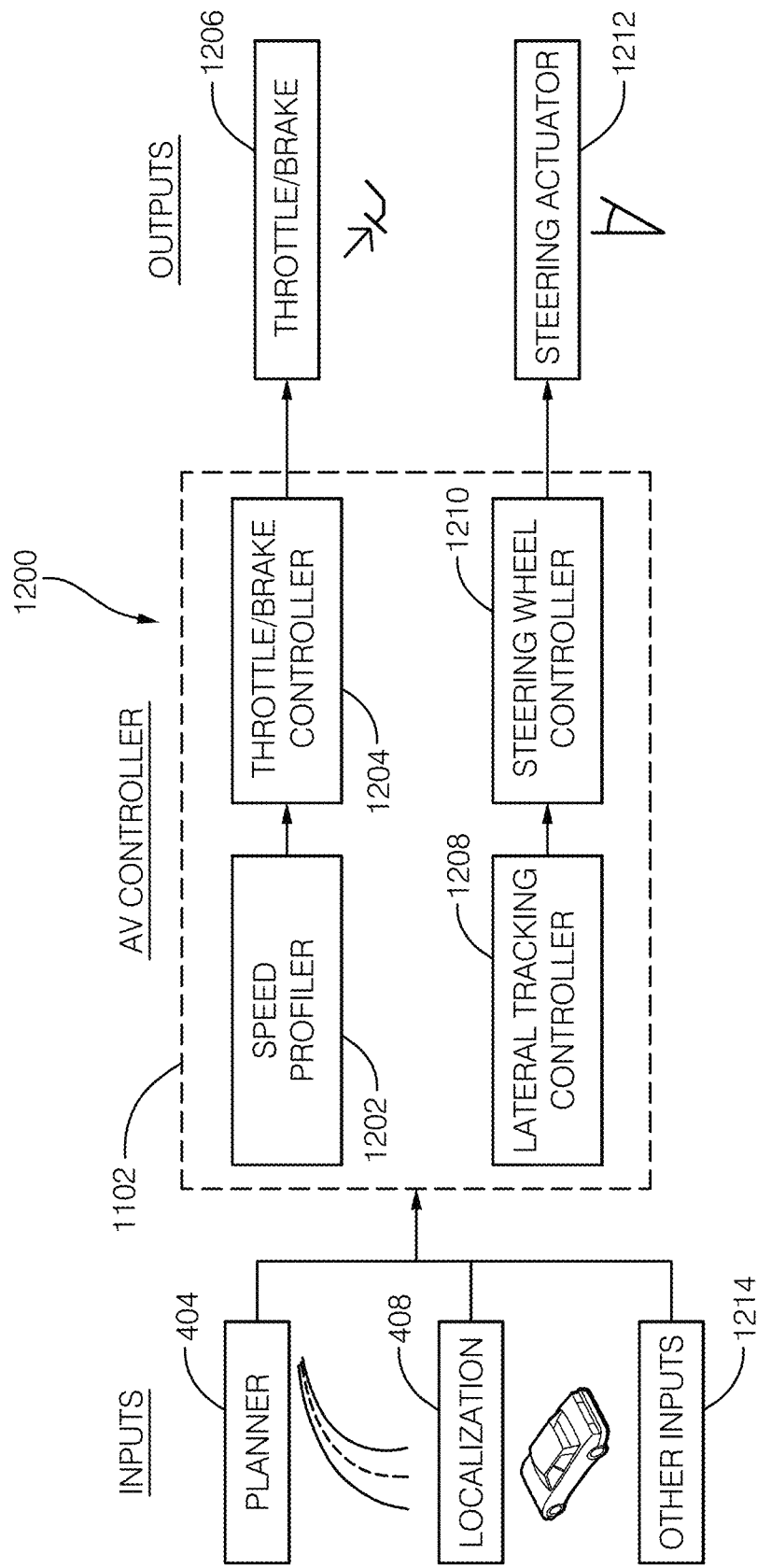
FIG. 12 shows a block diagram of the inputs, outputs, and components of a controller, in accordance with one or more embodiments.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Sequential Fusion for 3D Object Detection

Figure 13:
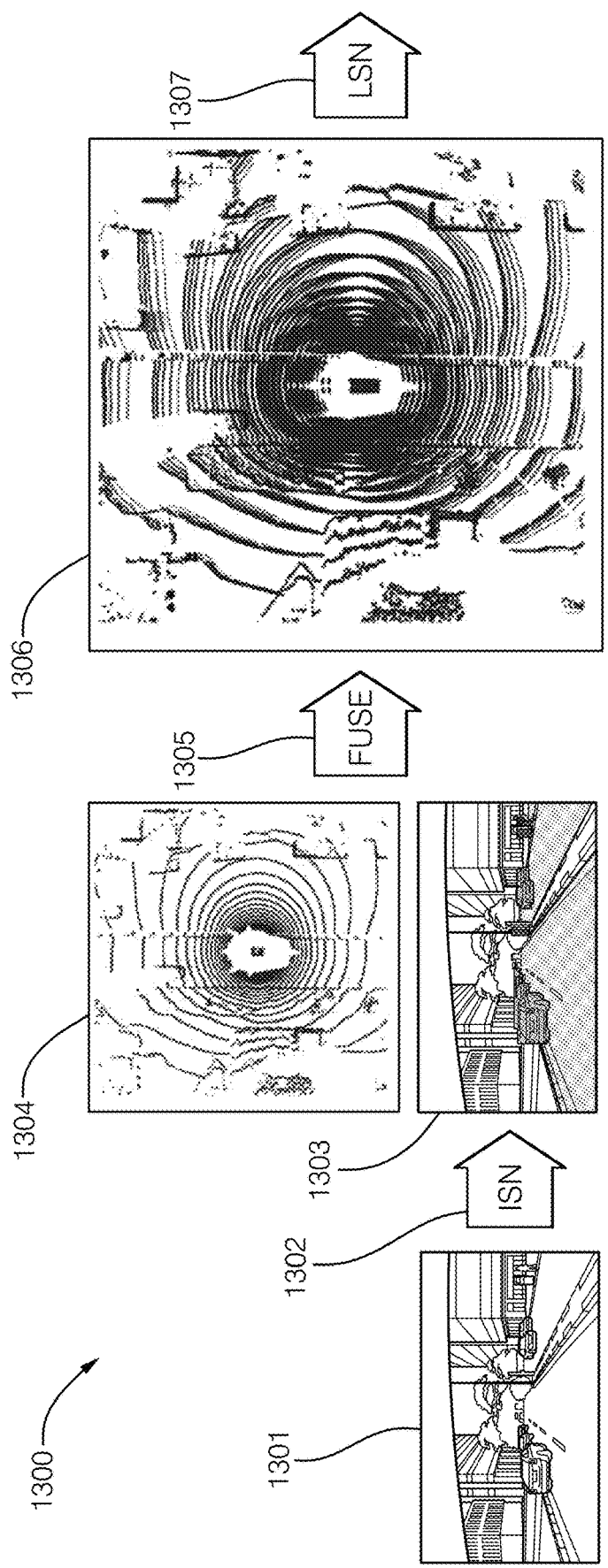
FIG. 13 illustrates fusing LiDAR features with semantic point decorations for more accurate 3D object detection, in accordance with one or more embodiments.

FIG. 13 illustrates fusing LiDAR features with semantic point decorations for more accurate 3D object detection, in accordance with one or more embodiments. System 1300 includes image 1301, image semantic segmentation network (ISN) 1302, segmented image 1303, LiDAR BEV 1304, fusion module 1305, decorated BEV 1306 and LiDAR segmentation network (LSN) 1307. In an embodiment, the ISN 1302 performs both image segmentation and object detection (i.e., computes 2D or 3D bounding boxes). In another embodiment, two networks can be used: one for image segmentation and one for object detection. The ISN 1302 takes an image as an input and outputs semantic data. In an embodiment, the semantic data are per pixel class probabilities, referred to as semantic segmentation scores. These semantic segmentation scores serve as compact summarized features of an image. There are several key advantages of using semantic segmentation in a fusion pipeline. First, semantic segmentation is an easier task than 3D object detection since segmentation only requires local, per pixel classification, while object detection requires 3D localization and classification. This means that semantic segmentation is easier to train and also amenable to using small, fast networks for inference. Second, rapid advances are being made in semantic segmentation, which allows this fusion strategy to benefit from advances in both segmentation and 3D object detection. Finally, in a robotics or autonomous vehicle system, semantic segmentation outputs are useful independent outputs for other tasks like free-space estimation.

In an embodiment, each point cloud is matched temporally (e.g., by comparing timestamps) to the most recent image captured by each camera, as illustrated in FIG. 13. The matching process, however, introduces latency in a real-time system as the fusion module 1305 has to wait for the semantic segmentation scores from the ISN 1302. In an embodiment, this latency is prevented by projecting the most recent point cloud to the semantic segmentation data output from the previous image in time.

The ISN 1302 takes as input the image 1301, predicts the class of each pixel in the image and outputs semantic segmentation data (e.g., a semantic segmentation score) for each pixel in the image 1301. The ISN 1302 is trained using a image dataset that includes images where each image is annotated with 2D bounding boxes and segmentation labels for classes in the image dataset. An example semantic segmentation score is a probability value that indicates the probability that the class of the pixel was correctly predicted.

The LiDAR points are transformed by fusion module 1305 from a LiDAR ego-vehicle coordinate frame to a camera coordinate frame and a segmentation score vector is obtained for each pixel where a point is projected in the camera coordinate frame. If the field of view of two cameras overlap, there will be some points that will project on two images simultaneously. In an embodiment, the segmentation score vector is randomly chosen from one of the two images.

Figure 15:
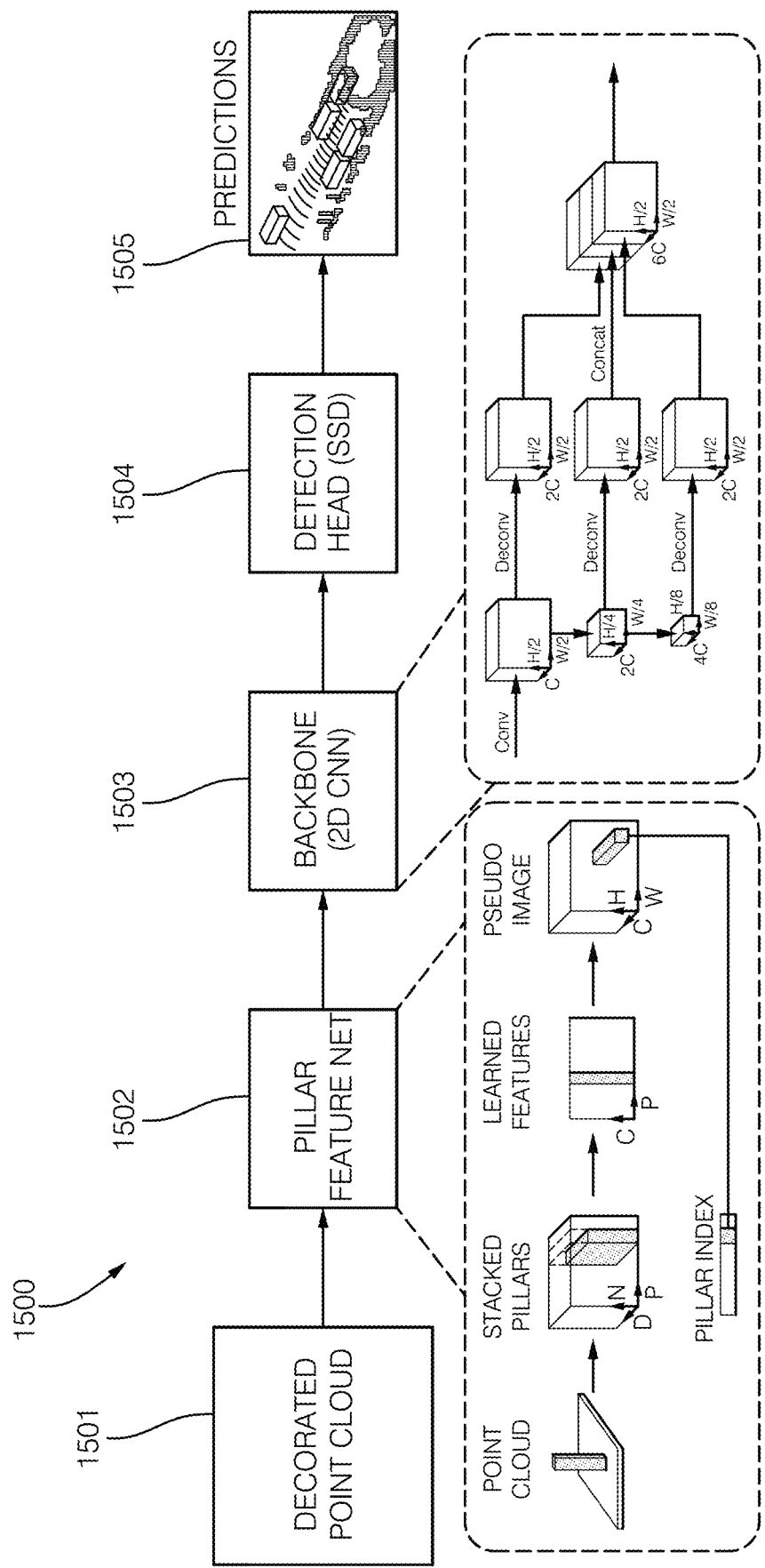
FIG. 15 is a block diagram of a point pillar network, in accordance with one or more embodiments.

In the embodiment shown, the decorated points are input into a pillar encoder that converts the point features to a sparse pseudo image, as described more fully in reference to FIG. 15. In an embodiment, the point pillars encoding for a point is $(x, y, z, i, x\_c, y\_c, z\_c, x\_p, y\_p)$, where $(x\_c, y\_c, z\_c)$ are the offsets of the point to an arithmetic mean of all points in the pillar, i is the intensity and $(x\_p, y\_p)$ are the offsets of the point to the pillar x and y center. The ISN generated semantic segmentation data is appended to this encoding. In an embodiment, the ISN generated semantic segmentation score is reduced to N classes. For example, the semantic segmentation score can be reduced to four (N=4) classes: cars (p\_car), bikes (p\_bike), pedestrians (p\_ped) and background (p\_background). Thus, the pillar encoding with the semantic segmentation scores for the four classes appended is given by $(x, y, z, i, x\_c, y\_c, z\_c, x\_p, y\_p, p\_car, p\_bike, p\_ped, p\_background)$. This pillar encoding is an example. Other pillar encodings can be used that include more or fewer semantic segmentation data.

The pseudo image output by the pillar encoder is passed to a deep learning backbone network, such as a 2D CNN, similar to the network described in Y. Zhou and O. Tuzel. Voxelnet: End-to-end learning for point cloud based 3D object detection. In *CVPR*, 2018.

The deep learning backbone computes and outputs features which are input into a detection head. The detection head outputs oriented 3D bounding boxes, as described in "PointPillars: Fast Encoders for Object Detection from Point Clouds, arXiv:1812.05784v2 [cs.LG] 7 May 2019. In an embodiment, the detection head is a single shot detection (SSD) head, as described in W. Liu, D. Anguelov, D. Erhan, C. Szegedy, S. Reed, C.-Y. Fu, and A. C. Berg. SSD: Single shot multibox detector. In *ECCV*, 2016.

In an embodiment, instead of, or in addition to, using the semantic segmentation from ISN 1402, the 2D detections (2D bounding boxes) are used to decorate the LiDAR points. For example, LiDAR points are decorated with the classification scores from the bounding box in which the point is contained. If a particular point falls into multiple overlapping bounding boxes, the points can be decorated by an average of the classification scores for the overlapping bounding boxes.

In an embodiment where the ISN 1402 produces 3D bounding boxes as outputs (e.g., a 3D ISN 1402), the points are decorated according to which 3D bounding box the point is contained. Because the points are decorated directly in 3D, there is no need to project the points into the 2D image plane.

Figure 14:
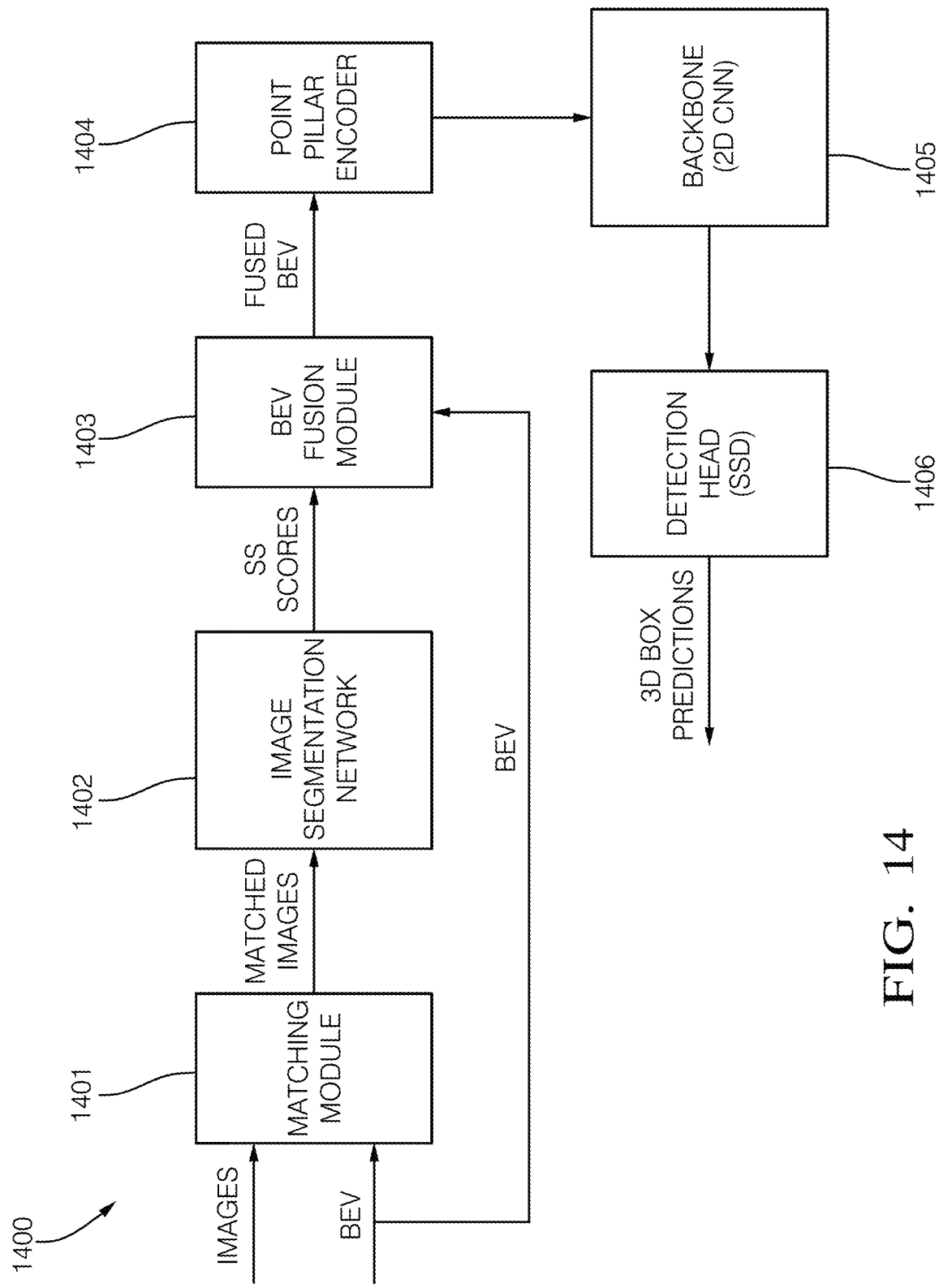
FIG. 14 is a block diagram of a system for fusing LiDAR features with semantic point decorations for more accurate 3D object detection, in accordance with one or more embodiments.

FIG. 14 is a block diagram of a system for fusing lidar features with semantic point decorations for more accurate 3D object detection, in accordance with one or more embodiments. System 1400 includes matching module 1401, ISN 1402, fusion module 1403, point pillar encoder 1404, deep learning backbone and detection head 1406.

In operation, camera images and LiDAR points are input into matching module 1401, which matches the point cloud scan temporally to corresponding images for all different camera channels. In an embodiment, time stamps can be used to match temporally LiDAR scans with camera images by, for example, taking the closest samples in time based on the time stamps. In an embodiment, latency is reduced by projecting the most recent point cloud scan to the semantic segmentation data output from the previous image in time since this allows the image processing to be completed by the time the LiDAR point cloud is recorded.

The output of the matching module are the matched images which are input into ISN 1402. As previously described, ISN 1402 provides both semantic segmentation and object detection. In another embodiment, two separate networks can be used: one for image segmentation and one for object detection. Some examples of detection classes are car, pedestrian, bike, barrier, traffic cone and drivable surface. The ISN 1402 is trained with a database of annotated images that can be resized and augmented. A loss function is applied to the predicted values and target values and the loss is backpropagated through the network to adjust the network weights. Some examples of image augmentation included but are not limited to zooming in, zooming out, photometric distortion and random flipping.

In an embodiment, the ISN 1402 includes a backbone and detection head. In an embodiment, the backbone is fully convolutional neural network (FCNN) and the detection head is a single shot multibox detector, as described in W. Liu et al. Various loss functions can be employed including but not limited to classification loss, localization loss and attribute loss. The output of ISN 1402 is semantic data. In an embodiment, the semantic data are semantic segmentation scores.

The sematic segmentation scores are input into fusion module 1402 together with a BEV of the matching LiDAR point cloud. Fusion module 1403 decorates the LIDAR points with the semantic segmentation data. The output of fusion module 1403 is a the decorated BEV, which input into point pillar encoder 1404.

Point pillar encoder 1404 augments the point pillar encoding with the semantic segmentation scores. In an embodiment, the semantic segmentation scores can be reduced to four classes: cars (p_car), bikes (p_bike), pedestrians (p_ped) and background (p_background). Thus, the pillar encoding with the four classes appended is given by (x, y, z, i, x_c, y_c, z_c, x_p, y_p, p_car, p_bike, p_ped, p_background). Other pillar encodings can be used that include more or fewer semantic segmentation data. The pillar encoder is described in further detail in reference to FIG. 15.

The output of the point pillar encoder 1404 is a pseudo-image. The generation of the pseudo-image is described in "PointPillars: Fast Encoders for Object Detection from Point Clouds, arXiv:1812.05784v2 [cs.LG] and U.S. patent application Ser. No. 16/679,099.

The pseudo-image is input into deep learning backbone 1405. In an embodiment, the backbone is a 2D CNN, as described in reference to FIG. 15. The output of the backbone 1405 are features that input into detection 1406, which estimates (predictions) of oriented 3D bounding boxes.

FIG. 15 is a block diagram of a point pillar network 1500, in accordance with one or more embodiments. A pillar feature network 1502 included in the point pillar network 1500 is configured to accept decorated point clouds as input and estimate/predict oriented 3D boxes for various classes, including but not limited to cars, pedestrians and cyclists. The network 1502 includes three main stages: 1) a feature encoder network 1502 that converts a point cloud to a sparse pseudo-image; 2) a 2D convolutional backbone 1503 to process the pseudo-image into a high-level representation; and 3) a detection head 1504 that detects and regresses 3D boxes 1505.

In an embodiment, to apply a 2D convolutional architecture, the pillar feature network 1502 converts the point cloud to a pseudo-image. We denote by "l" a point in a point cloud with coordinates x, y, z and reflectance r. As a first step the point cloud is discretized into an evenly spaced grid in the x-y plane, creating a set of pillars P with |P|=B. Note that there is no need for a hyper parameter to control the binning in the z dimension. The points in each pillar are then augmented with x_c, y_c, z_c, x_p and y_p where the c subscript denotes distance to the arithmetic mean of all points in the pillar and the p subscript denotes the offset from the pillar x, y center. The augmented lidar point l is now D=9 dimensional. The augmented LiDAR point is then further augmented with semantic segmentation data output by the ISN 1402, as described in reference to FIGS. 13 and 14. For example, the LiDAR point can be further augmented with four semantic segmentation scores reduced to the classes of car, bike, pedestrian and background, resulting in an augmented LiDAR point l that is now D=13 dimensional.

The set of pillars will be mostly empty due to sparsity of the point cloud, and the non-empty pillars will in general have few points in them. For example, at 0.162 m2 bins the point cloud from an HDL-64E Velodyne lidar has 6k-9k non-empty pillars in the range typically used in KITTI for ~97% sparsity. This sparsity is exploited by imposing a limit both on the number of non-empty pillars per sample (P) and on the number of points per pillar (N) to create a dense tensor of size (D, P, N). If a sample or pillar holds too much data to fit in this tensor the data is randomly sampled. Conversely, if a sample or pillar has too little data to populate the tensor, zero padding is applied.

Next, a simplified version of PointNet is used where, for each point, a linear layer is applied followed by Batch-Norm and ReLU to generate a (C, P, N) sized tensor, where Batch-Norm is described in S. Ioffe and C. Szegedy. Batch normalization: Accelerating deep network training by reducing internal covariate shift. *CoRR*, abs/1502.03167, 2015, and ReLU is described in V. Nair and G. E. Hinton. Rectified linear units improve restricted Boltzmann machines. In *ICML*, 2010. This is followed by a max operation over the channels to create an output tensor of size (C, P). Note that the linear layer can be formulated as a 1×1 convolution across the tensor resulting in very efficient computation. Once encoded, the features are scattered back to the original pillar locations to create a pseudo-image of size (C, H, W) where H and W indicate the height and width of the canvas.

In an embodiment, the backbone 1503 has two sub-networks: one top-down network that produces features at increasingly small spatial resolution and a second network that performs upsampling and concatenation of the top-down features. The top-down backbone can be characterized by a series of blocks Block (S, L, F). Each block operates at stride S (measured relative to the original input pseudo-image). A block has L 3×3 2D convolutional layers with F output channels, each followed by BatchNorm and a ReLU. The first convolution inside the layer has stride $$\frac{S}{S_{in}}$$

to ensure the block operates on stride S after receiving an input blob of stride $S_{in}$. All subsequent convolutions in a block have stride 1.

The final features from each top-down block are combined through upsampling and concatenation as follows. First, the features are upsampled, Up ($S_{in}$, $S_{out}$, F) from an initial stride $S_{in}$ to a final stride $S_{out}$ (both again measured wrt. original pseudo image) using a transposed 2D convolution with F final features. Next, BatchNorm and ReLU is applied to the upsampled features. The final output features are a concatenation of all features that originated from different strides.

In an embodiment, the detection head 1504 is implemented using the single shot detector (W. Liu et al.) setup to perform 3D object detection. Similar to SSD, the prior boxes are matched to the ground truth using 2D Intersection over Union (IoU), described in M. Everingham, L. Van Gool, C. K. I. Williams, J. Winn, and A. Zisserman. The pascal visual object classes (VOC) challenge. *International Journal of Computer Vision*, 2010. Bounding box height and elevation were not used for matching; instead given a 2D match, the height and elevation become additional regression targets.

Figure 16:
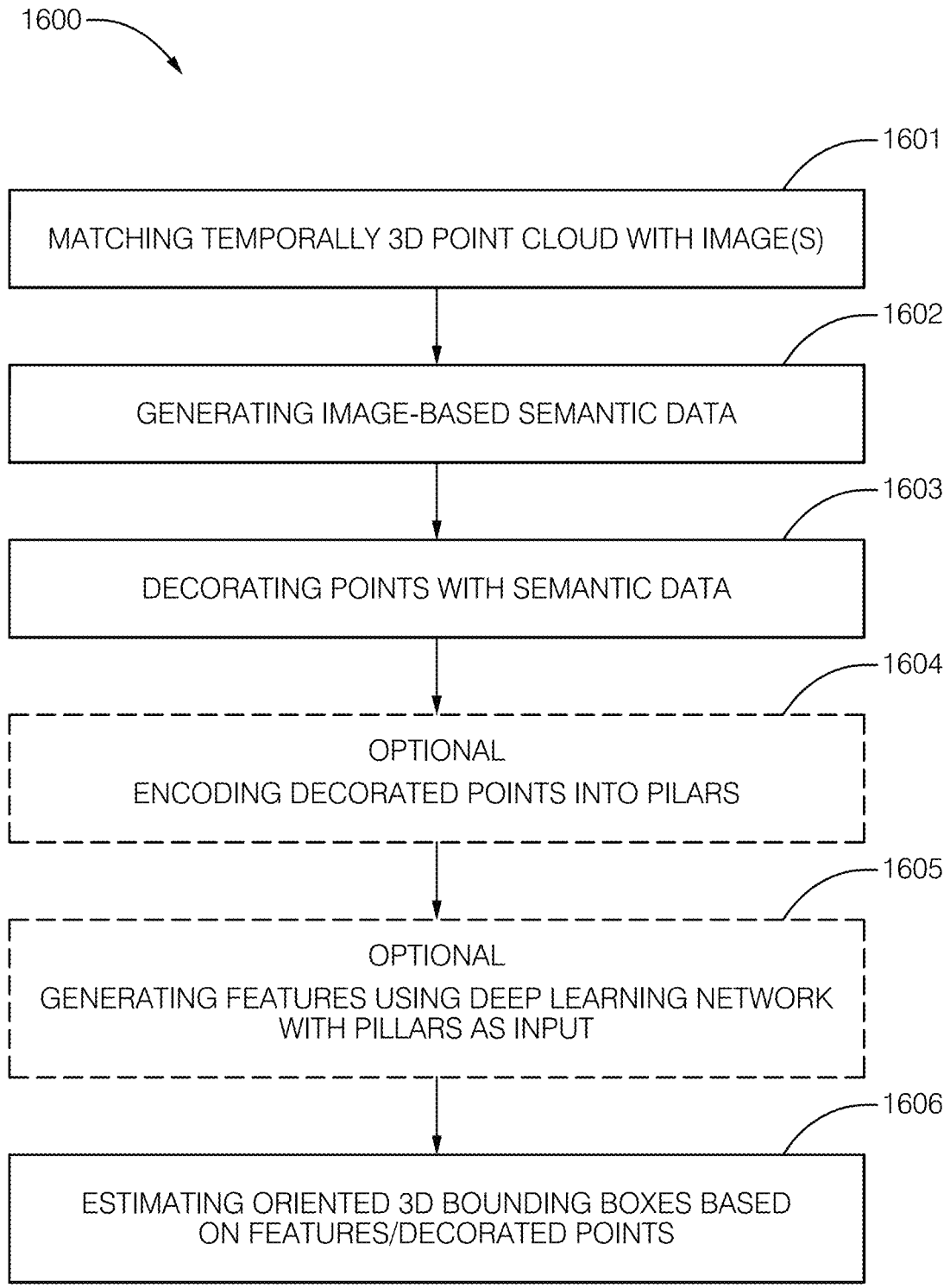
FIG. 16 is a flow diagram of a process of fusing LiDAR features with semantic point decorations for more accurate 3D object detection, in accordance with one or more embodiments.

FIG. 16 is a flow diagram of a process 1600 of fusing LiDAR features with semantic point decorations for more accurate 3D object detection, in accordance with one or more embodiments.

Process 1600 begins by matching temporally a 3D point cloud with one or more images (1601), generating image semantic data (1602) and decorating the points with the semantic data (1603). For example, semantic segmentation scores can be reduced to a number of classes, such as car, bike, pedestrians and background, as described in reference to FIGS. 13 and 14.

Process 1600 continues by optionally encoding the decorated points into point pillars (1604). For example, the encoding can include D=13 dimensions: Thus, the pillar encoding with the four classes (car, bike, pedestrians and background) appended is given by (x, y, z, i, x_c, y_c, z_c, x_p, y_p, p_car, p_bike, p_ped, p_background), as described in reference to FIGS. 13-15. Other pillar encodings can be used that include more or fewer semantic segmentation data.

If the optional point pillar network is used, process 1600 continues by generating features using a 2D CNN backbone (1605). In an embodiment, the backbone includes two sub-networks: one top-down network that produces features at increasingly small spatial resolution and a second network that performs upsampling and concatenation of the top-down features, as described in reference to FIG. 15.

Process 1600 continues by estimating/predicting oriented 3D bounding boxes based on the features if the point pillar network is used or decorated points in any desired view (e.g., BEV, forward-view) for other detection networks (1606). For example, in the point pillar network a SSD detection head can be used to estimate/predict oriented 3D bounding boxes (i.e., 3D object detection).

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

The invention claimed is:

1. A method comprising:
matching temporally, using one or more processors of a vehicle, points in a three-dimensional (3D) point cloud with an image;
generating, using a neural network, a semantic segmentation scores for the image;
decorating, using the one or more processors, the points in the 3D point cloud with the semantic segmentation scores to generate decorated points; and
estimating, using a point pillars network and the decorated points, oriented 3D bounding boxes for the one or more objects.

2. The method of claim 1, wherein estimating, using a point pillars network and the decorated points, oriented 3D bounding boxes for the one or more objects comprises:
encoding, using the point pillars network, the decorated points into point pillars;
generating, using a deep learning network with the point pillars as input, features indicative of one or more objects;
estimating, using a detection head with the features as input, oriented 3D bounding boxes for the one or more objects.

3. The method of claim 1, wherein decorating the points in the 3D point cloud with the semantic segmentation scores further comprises:
projecting the 3D point cloud into a birds eye view (BEV); and
decorating points in the BEV with the semantic data.

4. The method of claim 1, wherein matching temporally the points in the 3D point cloud with the image includes projecting a most recent point cloud to a semantic segmentation scores output from a previous image in time.

5. The method of claim 1, wherein each particular point is transformed from a light detection and ranging (LiDAR) ego-vehicle coordinate frame to a camera coordinate frame and a segmentation score vector is obtained for each pixel in the image where the particular point is projected in the camera coordinate frame.

6. The method of claim 5, further comprising:
determining that one or more points project on two images simultaneously; and
randomly choosing the segmentation score vector from one of the two images.

7. The method of claim 2, wherein encoding the decorated points into point pillars includes augmenting point pillar values with the semantic segmentation scores.

8. The method of claim 7, wherein the points in each pillar include the values x_c, y_c, z_c, x_p and y_p where the values x_c, y_c, z_c denote a distance to an arithmetic mean of all points in the pillar and x_p and y_p denote the offset from the pillar x, y center, and where the points in each pillar are augmented with the semantic segmentation scores.

9. The method of claim 1, wherein the semantic segmentation scores include semantic segmentation scores reduced to one or more classes in a set of classes that includes at least one of car, bike, pedestrian, barrier, traffic cone, drivable surface or background classes.

10. The method of claim 1, further comprising:
generating, using the image-based neural network, two-dimensional (2D) or three-dimensional (3D) bounding boxes; and
decorating the points with classification scores for the 2D or 3D bounding boxes in addition to the semantic data or instead of the semantic data.

11. The method of claim 10, further comprising:
determining that the two or more bounding boxes are overlapping and include a common point;
computing an average of the classification scores for the two or more overlapping bounding boxes; and decorating the common point with the average of the classification scores.

12. A system comprising:
one or more processors of a vehicle; and
memory storing instructions that when executed by the one or more processors, cause the one or more processors to perform operations comprising:
matching temporally points in a three-dimensional (3D) point cloud with an image;
generating, using a neural network, semantic segmentation scores for the image;
decorating the points in the 3D point cloud with the semantic segmentation scores to generate decorated points; and
estimating, using a point pillars network and the decorated points, oriented 3D bounding boxes for the one or more objects.

13. The system of claim 12, wherein estimating, using a point pillars network and the decorated points, oriented 3D bounding boxes for the one or more objects comprises:
encoding, using the point pillars network, the decorated points into point pillars;
generating, using a deep learning network with the point pillars as input, features indicative of one or more objects;
estimating, using a detection head with the features as input, oriented 3D bounding boxes for the one or more objects.

14. The system of claim 12, wherein decorating the points in the 3D point cloud with the semantic segmentation scores further comprises:
projecting the 3D point cloud into a birds eye view (BEV); and
decorating points in the BEV with the semantic data.

15. The system of claim 12, wherein matching temporally the points in the 3D point cloud with the image includes projecting a most recent point cloud to a semantic segmentation scores output from a previous image in time.

16. The system of claim 12, wherein each particular point is transformed from a light detection and ranging (LiDAR) ego-vehicle coordinate frame to a camera coordinate frame and a segmentation score vector is obtained for each pixel in the image where the particular point is projected in the camera coordinate frame.

17. The system of claim 16, further comprising:
determining that one or more points project on two images simultaneously; and
randomly choosing the segmentation score vector from one of the two images.

18. The system of claim 13, wherein encoding the decorated points into point pillars includes augmenting point pillar values with the semantic segmentation scores.

19. The system of claim 18, wherein the points in each pillar include the values x_c, y_c, z_c, x_p and y_p where the values x_c, y_c, z_c denote a distance to an arithmetic mean of all points in the pillar and x_p and y_p denote the offset from the pillar x, y center, and where the points in each pillar are augmented with the semantic segmentation scores.

20. The system of claim 12, wherein the semantic segmentation scores include semantic segmentation scores reduced to one or more classes in a set of classes that includes at least one of car, bike, pedestrian, barrier, traffic cone, drivable surface or background classes.

21. The system of claim 12, further comprising:
generating, using the image-based neural network, two-dimensional (2D) or three-dimensional (3D) bounding boxes; and
decorating the points with classification scores for the 2D or 3D bounding boxes in addition to the semantic data or instead of the semantic segmentation scores.

22. The system of claim 21, further comprising:
determining that the two or more bounding boxes are overlapping and include a common point;
computing an average of the classification scores for the two or more overlapping bounding boxes; and
decorating the common point with the average of the classification scores.

23. A non-transitory computer-readable storage medium storing instructions that when executed by the one or more processors, cause the one or more processors to perform operations comprising:
matching temporally points in a three-dimensional (3D) point cloud with an image;
generating, using a neural network, semantic segmentation scores for the image;
decorating the points in the 3D point cloud with the semantic segmentation scores to generate decorated points; and
estimating, using a point pillars network and the decorated points, oriented 3D bounding boxes for the one or more objects.

24. The non-transitory computer-readable storage medium of claim 23, wherein decorating the points in the 3D point cloud with the semantic data further comprises:
encoding, using the point pillars network, the decorated points into point pillars;
generating, using a deep learning network with the point pillars as input, features indicative of one or more objects;
estimating, using a detection head with the features as input, oriented 3D bounding boxes for the one or more objects.

* * * * *

UNITED STATES PATENT AND TRADEMARK OFFICE
CERTIFICATE OF CORRECTION

| | | |
|---|---|---|
| PATENT NO. | : 11,634,155 B2 | Page 1 of 1 |
| APPLICATION NO. | : 17/534674 | |
| DATED | : April 25, 2023 | |
| INVENTOR(S) | : Sourabh Vora et al. | |

It is certified that error appears in the above-identified patent and that said Letters Patent is hereby corrected as shown below:

On the Title Page

In Related U.S. Application Data
On page 2, item (60), delete "62/935,917" and insert -- 62/935,617 --

Signed and Sealed this
Sixth Day of June, 2023

Katherine Kelly Vidal
*Director of the United States Patent and Trademark Office*